United States Patent [19]
McKenzie

[11] Patent Number: 6,101,293
[45] Date of Patent: Aug. 8, 2000

[54] DIGITAL SPECIAL PANTOGRAPH

[75] Inventor: John K. K. M. McKenzie, Hamden, Conn.

[73] Assignee: Moore U.S.A., Inc., Grand Island, N.Y.

[21] Appl. No.: 08/954,473

[22] Filed: Oct. 20, 1997

[51] Int. Cl.[7] .................................................. G06K 9/32
[52] U.S. Cl. .................................... 382/299; 382/100
[58] Field of Search ................................ 382/298, 299, 382/300, 294, 293, 100; 358/401, 450

[56]  References Cited

U.S. PATENT DOCUMENTS

| | | | |
|---|---|---|---|
| Re. 33,316 | 8/1990 | Katsuta et al. | 364/521 |
| 4,575,805 | 3/1986 | Moermann et al. | 364/474 |
| 4,953,485 | 9/1990 | Brower et al. | 112/262.3 |
| 5,142,616 | 8/1992 | Kellas et al. | 395/135 |
| 5,245,328 | 9/1993 | Garrett | 345/149 |
| 5,552,894 | 9/1996 | Aiba | 382/299 |
| 5,559,905 | 9/1996 | Greggain et al. | 382/298 |
| 5,621,826 | 4/1997 | Katayama et al. | 382/299 |
| 5,742,708 | 4/1998 | Yeh et al. | 382/299 |

*Primary Examiner*—Yon J. Couso
*Attorney, Agent, or Firm*—Nixon & Vanderhye P.C.

[57]  ABSTRACT

A paper document, such as a business form, is printed with a pantograph that is obtained from a pattern on a negative that is substantially incapable of construction by repeating geometric or organic shapes. A positive of the pattern is scanned to create a high resolution digital image in a computer, the high resolution image is interpolated to a low resolution digital image, the image is stored in the computer, for example as full size. Alternatively a rectangular tile that can be repeated substantially seamlessly is created and using the rectangular tile as a pattern an electronic document of desired size is created by manipulating and repeating the rectangular tile pattern. At least two different density versions of the low resolution digital image are preferably produced and stored.

20 Claims, 3 Drawing Sheets

DIGITAL SPECIAL PANTOGRAPH

BACKGROUND AND SUMMARY OF THE INVENTION

There are many times in the production of documents, such as business forms, that it is desirable to have a background pantograph. Conventional business form composition software for this purpose, such as available from Amgraf, takes a scanned in pattern having geometric or organic shapes and repeats a pattern by repeating the geometric or organic shapes to create new patterns in order to produce a fill for the pantograph or other graphic. However there are some patterns that are not repetitious, or cannot be made by repeating geometric or organic shapes. Such patterns are very difficult to reproduce digitally with conventional business forms composition packages.

Also, some business forms manufacturers or other entities have existing patterns for producing pantographs that were created decades ago. No originals still exist of those patterns (all negatives presently existing are duplicates of the originals). Of course these patterns were produced before digital compositions using computers were available, and it is highly desirable to now be able to construct those long-standing, commonly used and requested, pantographs into digital form so that the pattern can be reproduced digitally utilizing modern equipment.

According to the present invention methods are provided that allow long existing patterns to be produced digitally, even if such patterns—or other existing patterns—are substantially incapable of construction by repeating geometric or organic shapes. That is according to the invention it is possible to produce digital images from patterns substantially incapable of construction by repeating geometric or organic shapes, and to print physical documents from the digital images so produced, which documents can be printed either in full size form (from the original pattern), or of varying sizes.

According to one aspect of the present invention a method of printing a document with a pattern substantially incapable of construction by repeating geometric or organic shapes is provided. The method comprises the steps of: (a) Scanning a positive of a pattern substantially incapable of construction by repeating geometric or organic shapes to create a high resolution digital image in a computer. (b) Interpolating the high resolution image to a low resolution digital image. (c) Storing the low resolution digital image in a computer. And, (d) printing a physical document from the image stored in step (c).

Step (a) may be practiced to produce an image having a resolution of about 1000–1400 pixels per inch (e.g. about 1200 ppi) and step (b) is practiced to produce an image of about 200–400 ppi (e.g. about 280 ppi). Also steps (b) and (c) are preferably practiced to produce and store at least two different density versions of the low resolution digital image (e.g. nominal densities of about 10% and 20%). Steps (b) and (c) may be practiced to produce and store a substantially full size version of the pattern from step (a), and step (d) may be practiced to print the image substantially full size. Alternatively, the method comprises the further steps, between steps (c) and (d), of (e) creating a rectangular tile that can be repeated substantially seamlessly, and (f) using the rectangular tile as a pattern, creating an electronic document. Step (e) is typically practiced to produce a rectangular tile having a size of between about 1200–1450 pixels (e.g. about 1325 pixels, or 1330 pixels)×700–850 pixels (preferably about 775 pixels, e.g. 768 pixels) which translates to—in the most specific version—4.743 inches× 2.743 inches if used at 100%.

Step (b) is practiced to destroy much of the existing halftone pattern from the positive in order to eliminate moire patterns in the final product, using a Gaussian Blur, e.g. using an approximately one pixel Gaussian Blur.

The method also preferably comprises the further step (g), before step (a), of creating the positive from a pre-existing negative by exposure to a bromide, and step (a) is practiced to scan a substantially 8 inch×10 inch section of the positive of the pattern. One particular pattern that is particularly suited for practice according to the invention is the SP-5043 pantograph, a pantograph originally made as negatives in the 1960s by Moore U.S.A., Inc. (formerly Moore Business Forms, Inc.) of Lake Forest, Ill.

According to another aspect of the present invention a method of printing a business form with a pattern existing in an original pantograph negative (such as SP-5043) is provided. The method comprises the steps of: (a) Making a positive from the original pantograph negative. (b) Scanning the positive from step (a) to create a high resolution digital image in a computer. (c) Interpolating the high resolution image to a low resolution digital image. (d) Creating a rectangular tile that can be repeated substantially seamlessly. (e) Using the rectangular tile as a pattern, creating an electronic document of desired size by manipulating and repeating the rectangular tile pattern. And, (f) using the electronic document, printing a physical business form having a pantograph background generally corresponding to the original pantograph negative.

Step (b) is typically practiced to produce an image of about 1000–1400 ppi (e.g. about 1200 ppi) and step (c) is practiced to produce an image of about 200–400 ppi (e.g. about 280 ppi). Other details of the practice of the various steps preferably are as described above.

It is the primary object of the present invention to provide digital patterns from pre-existing patterns substantially incapable of construction by repeating geometric or organic shapes, and for in general to provide a method of creating business forms or like documents from a pattern existing in an original pantograph negative using modern digital techniques. This and other objects of the invention will become clear from an inspection of the detailed description of the invention, and from the appended claims.

DETAILED DESCRIPTION OF THE DRAWINGS

Figure 1:
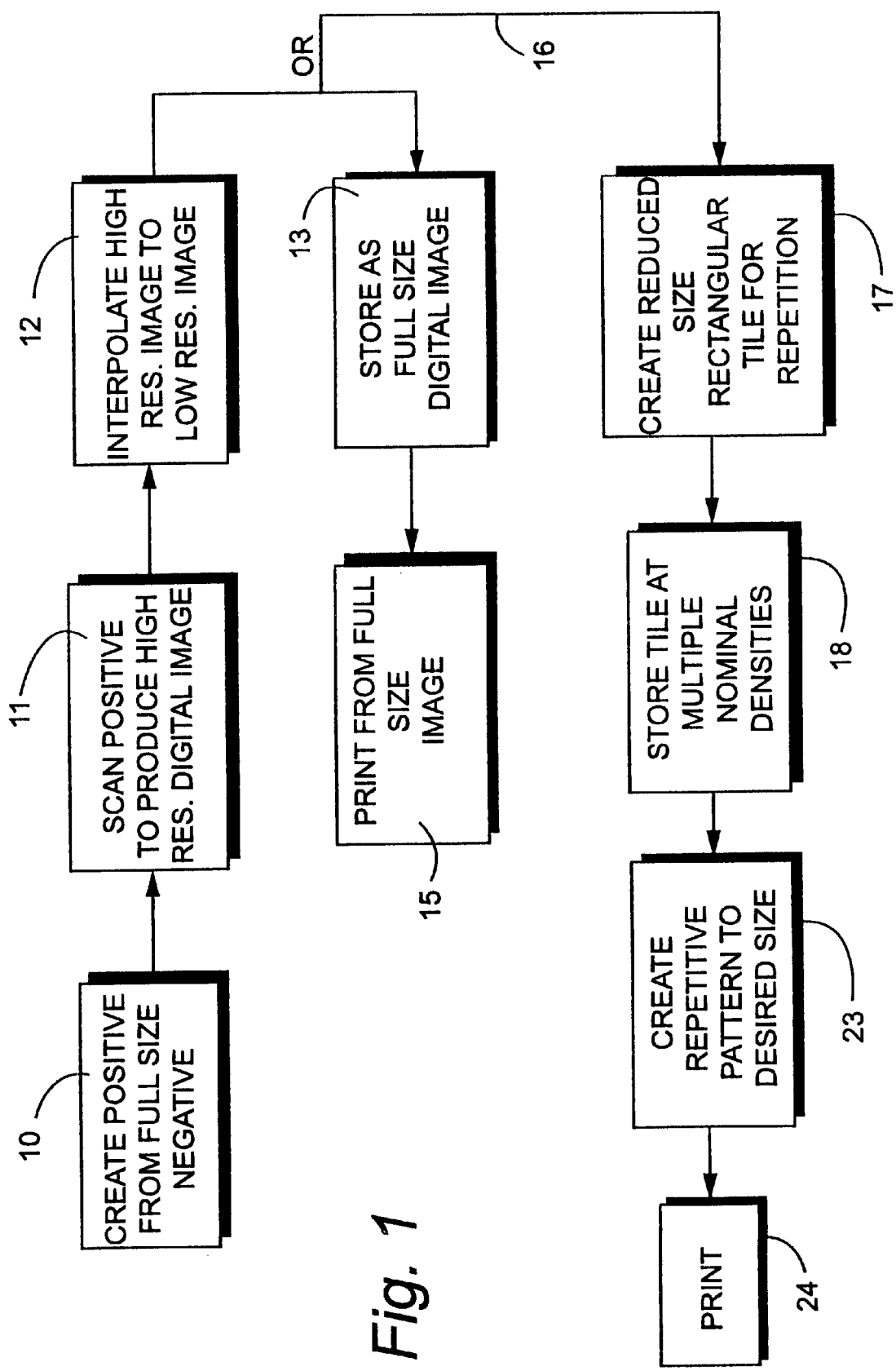
FIG. 1 is a box diagram showing exemplary method steps that may be practiced according to the method of the present invention.

FIG. 1 schematically illustrates the exemplary method steps that may be practiced according to the present invention. The method will be described with respect to the production of a digital version of the SP-5043 pantograph of Moore U.S.A., Inc., however it is to be understood that the method may be practiced utilizing other existing pantographs, or otherwise practiced to produce digital versions of pantographs for the purpose of printing business forms or like documents.

Using a good quality negative of an SP-5043 pantograph, a paper positive, or bromide, is created from the full size negative as illustrated schematically at 10 in FIG. 1. The bromide or positive created is then scanned on a flatbed scanner to produce a high resolution digital image, as indicated at 11 in FIG. 1. For example an approximately 8 inch×10 inch section of the paper positive is scanned on an Epson ES-1200C flatbed scanner at a Power Macintosh workstation in eight-bit greyscale mode at about 1000–1400 ppi (e.g. at about 1200 ppi), and acquired into appropriate software, such Photoshop® conventional software, available from Adobe Systems of Mountain View, Calif. This high resolution image is then interpolated down to a lower resolution image, as indicated schematically at 12 in FIG. 1. For example the lower resolution image may be about 200–400 ppi (e.g. about 280 ppi).

The procedure of scanning at a high resolution and interpolating down to a more optimal, lower, resolution, is indicated at steps 11 and 12 in FIG. 1, has the effect of destroying much of the halftone pattern from the paper positive, in order to eliminate moire patterns in the final product. Typically a Gaussian Blur is utilized; for example an approximately one pixel Gaussian Blur is sufficient to complete the removal of the halftone pattern.

After step 12 in FIG. 1 the image may be stored as a full size image as indicated schematically at 13 in FIG. 1, and a document, such as a business form, may be printed on paper or another substrate (or otherwise produced in physical form) utilizing conventional techniques (e.g. conventional printers or imagers) as indicated at 15 in FIG. 1. However storing the image at 8 inches×10 inches consumes a significant amount of memory in the computer, therefore it is desirable to follow the technique indicated schematically by alternative arrow 16 in FIG. 1.

The alternative techniques starting with arrow 16 in FIG. 1, the next step, 17, is to create a reduced size rectangular tile which can be repeated substantially seamlessly. For example this may be accomplished using a Terrazzo plug-in in the Photoshop® software. After some trial and error, a rectangular tile with a relatively unobtrusive repeating pattern may be created, which can be used for the easy creation of blocks larger than eight inches wide or ten inches deep, or smaller versions, should they be needed. The utilization of rectangular tiles is particularly important for use with the Mecca system of Amgraf.

The rectangular tile so produced is stored in the computer in digital format, as illustrated schematically at 18 in FIG. 1. Preferably the tile is stored at two or more densities, such as a nominal density of about 20% and a nominal density of about 10%. The final tile is desirably of a size of between about 1200–1450 pixels (e.g. about 1325 pixels, that is specifically 1330 pixels)×700–850 pixels (that is about 775 pixels, e.g. 768 pixels). This translates—for 1330×768 pixels—to 4.743 inches×2.743 inches if used at 100%. Printouts of two such rectangular tiles are shown at 20 and 21 in FIGS. 2 and 3, respectively.

Figure 2:
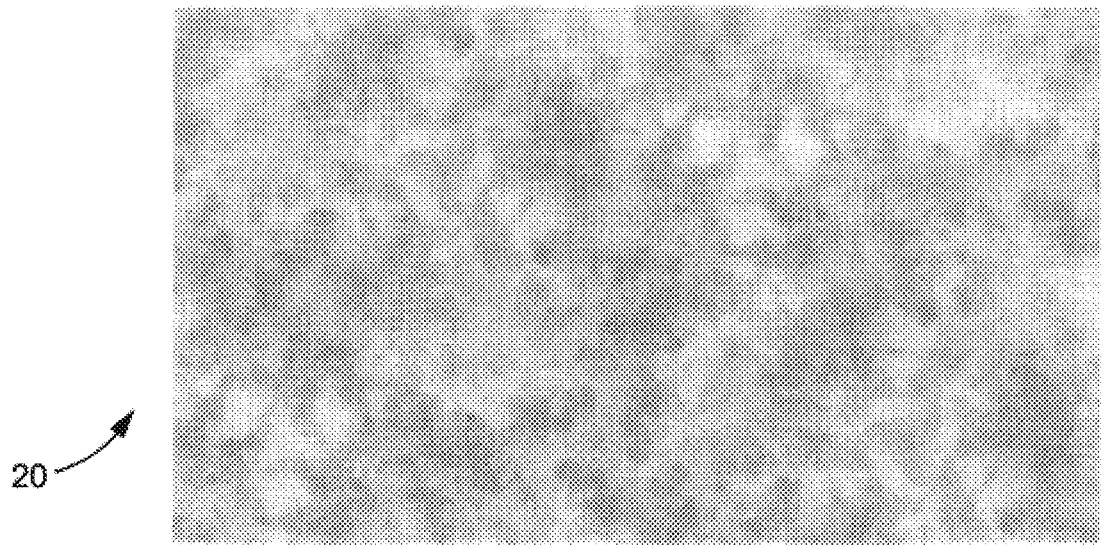
FIGS. 2 and 3 are nominal 20% and nominal 10% photographs, respectively, of rectangular tiles (actual size) that may be produced utilizing the method of FIG. 1.
Figure 3:
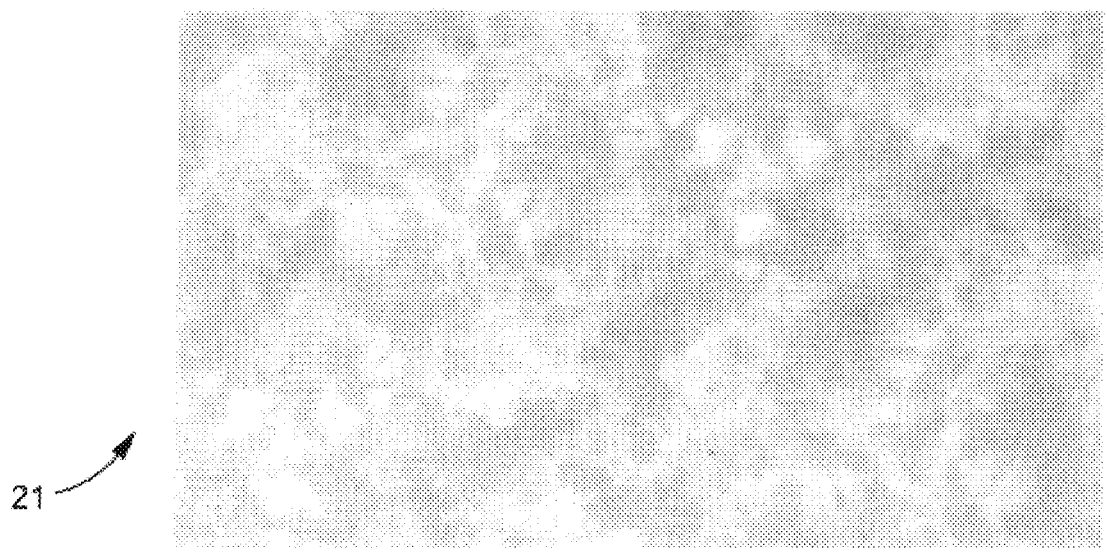

The rectangular tile 20 in FIG. 2, shown in full size, has a nominal density of about 20%. However the actual density may vary slightly therefrom; for example, for the exact representation 20 in FIG. 2, the median pixel level is 212, or about 18%. The rectangular tile 21 in FIG. 3, also shown in full size, has a nominal density of about 10%; in this case, for the actual version illustrated, both the mean and median pixel levels are 233, or about 9%.

On a Macintosh® computer, a tile 20, 21 may be used by defining it as a "pattern" in the Photoshop® software, and then filling a Photoshop® electronic document of the needed size with that pattern, and then saving that electronic document as a TIFF file for use in the construction of the business form or other document. Stock sizes may be utilized and kept on hand. Also on a Mecca system of Amgraf the tile 20, 21 could be used as a pantograph in the Box Programmer.

The image of the tile 20, 21 is, in the preferred form, at about 280 ppi; it can't be enlarged too much because the physical rule that a resolution of no less than 1.5×LPI at which the negative is output, must be followed. However the tile 20, 21 can readily be reduced without difficulty for documents or document areas of less than 4.743 inches× 2.743 inches. If it is used for documents or document areas greater than that size, as indicated above for the case of use in the Macintosh® computer, it is defined a pattern in the Photoshop® software and repetitive patterns are created to the desired size as indicated schematically at 23 in FIG. 1, to produce a document of the desired construction. Then the digital image from which that is formed is used to print (using any standard impact or non-impact printer or like imaging device) a business form or document is indicated at step 24 in FIG. 1.

Figure 4:
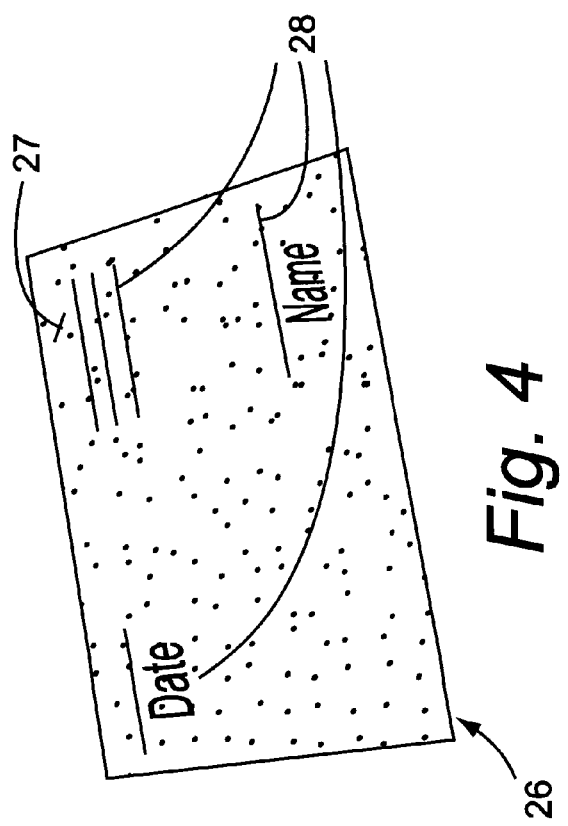

FIG. 4 schematically illustrates a business form 26 produced utilizing steps 13 and 15 of FIG. 1, the background pantograph substantially filling the paper comprising the document 26. Of course smaller size patterns may also be utilized, but larger size documents cannot be produced. Of course in producing the final business form 26 other indicia is typically imaged on the document 26, such as the indicia and other images illustrated generally at 28 in FIG. 4 which provide the appropriate information for the actual business form purposes of the business form 26.

Figure 5:
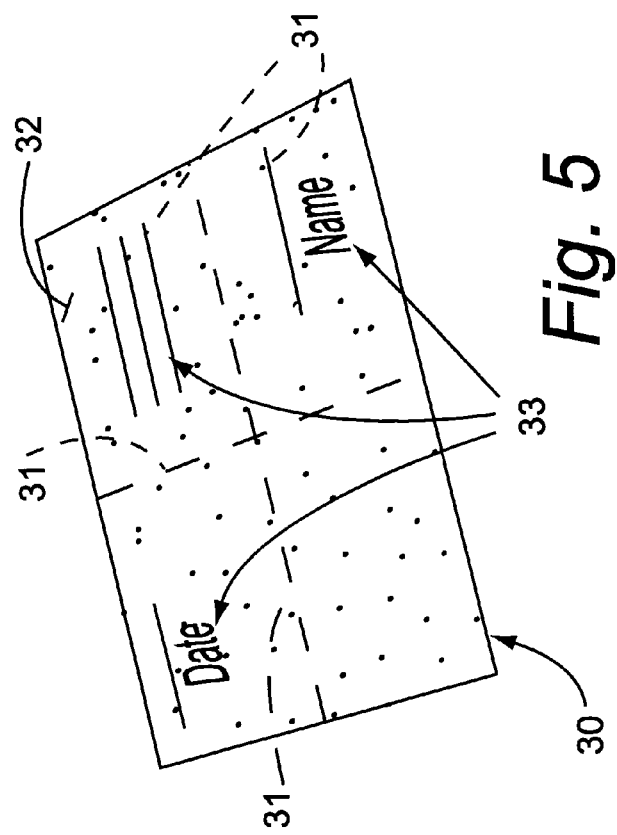
FIGS. 4 and 5 are schematic perspective views showing exemplary business forms that may be produced using the method of FIG. 1.

FIG. 5 shows an exemplary business form 30 according to the present invention produced utilizing the techniques 17, 18, 23 and 24 of FIG. 1 rather than the techniques 13, 15. In this case four of the rectangular tiles 20 and 21, or reduced size versions thereof, are substantially seamlessly connected (although seams 31 are illustrated in FIG. 1 merely to show the concept) to provide the background pantograph 32. The other indicia to allow use of the printed sheet as a business form 30 is shown schematically by reference numeral 33 in FIG. 5.

It will thus be seen that according to the present invention a highly advantageous method of digitally creating and then printing a business form having background pantographs or the like, is provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and procedures.

What is claimed is:

1. A method of printing a document with a pattern substantially incapable of construction by repeating geometric or organic shapes, said method comprising the steps of:

(a) scanning a positive of a pattern substantially incapable of construction by repeating geometric or organic shapes to create a high resolution digital image in a computer;

(b) interpolating the high resolution image to a low resolution digital image;

(c) storing the low resolution digital image in a computer; and (d) printing a physical document from the image stored in step (c).

2. A method as recited in claim 1 wherein step (a) is practiced to produce an image having a resolution of about 1000–1400 pixels per inch, and step (b) is practiced to produce an image of about 200–400 pixels per inch.

3. A method as recited in claim 1 comprising the further steps, between steps (c) and (d), of (e) creating a rectangular tile that can be repeated substantially seamlessly, and (f) using the rectangular tile as a pattern, creating an electronic document.

4. A method as recited in claim 3 wherein step (e) is practiced to produce a rectangular tile having a size of between about 1200–1450 pixels by 700–850 pixels.

5. A method as recited in claim 1 wherein steps (b) and (c) are practiced to produce and store at least two different density versions of the low resolution digital image.

6. A method as recited in claim 5 wherein steps (b) and (c) are practiced to produce and store the low resolution image at nominal densities of about 10% and 20%.

7. A method as recited in claim 1 wherein steps (b) and (c) are practiced to produce and store a substantially full size version of the pattern from step (a), and step (d) is practiced to print the image substantially full size.

8. A method as recited in claim 7 comprising the further step (g), before step (a), of creating the positive from a negative.

9. A method as recited in claim 1 comprising the further step (g), before step (a), of creating the positive from a negative.

10. A method as recited in claim 2 wherein step (a) is practiced to produce an image having a resolution of about 1200 pixels per inch, and step (b) is practiced to produce an image having a resolution of about 280 pixels per inch.

11. A method as recited in claim 4 wherein step (e) is practiced to produce a rectangular tile about 1325×75 pixels in size.

12. A method as recited in claim 1 wherein step (b) is practiced to destroy much of the existing halftone pattern from the positive in order to eliminate moire patterns, using a Gaussian Blur.

13. A method as recited in claim 12 wherein step (b) is further practiced by using an approximately one pixel Gaussian Blur.

14. A method as recited in claim 9 wherein step (a) is practiced to scan a substantially 8"×10" section of the positive of the pattern.

15. A method as recited in claim 9 wherein step (g) is practiced from an SP-5043 pantograph negative.

16. A method of printing a business form with a pattern existing in an original pantograph negative, comprising the steps of:
   (a) making a positive from the original pantograph negative;
   (b) scanning the positive from step (a) to create a high resolution digital image in a computer;
   (c) interpolating the high resolution image to a low resolution digital image;
   (d) creating a rectangular tile that can be repeated substantially seamlessly;
   (e) using the rectangular tile as a pattern, creating an electronic document of desired size by manipulating and repeating the rectangular tile pattern; and
   (f) using the electronic document, printing a physical business form having a pantograph background generally corresponding to the original pantograph negative.

17. A method as recited in claim 16 wherein step (b) is practiced to produce an image of about 1000–1400 pixels per inch, and step (c) is practiced to produce an image of about 200–400 pixels per inch.

18. A method as recited in claim 17 wherein step (d) is practiced to produce a rectangular tile having a size of between about 1200–1450 pixels by about 700–850 pixels.

19. A method as recited in claim 18 wherein step (b) is practiced to scan a substantially 8"×10" section of the positive of the pattern.

20. A method as recited in claim 19 wherein steps (c) and (d) are practiced to produce and store at least two different density versions of the low resolution digital image.

* * * * *